Feb. 18, 1969 B. M. EPSTEIN 3,428,756

DIAL PULSE TRANSIENT DETECTOR

Filed Dec. 23, 1965 Sheet 1 of 3

INVENTOR
B. M. EPSTEIN
BY John K. McGarvey
ATTORNEY

Feb. 18, 1969 B. M. EPSTEIN 3,428,756

DIAL PULSE TRANSIENT DETECTOR

Filed Dec. 23, 1965 Sheet 3 of 3

United States Patent Office 3,428,756

Patented Feb. 18, 1969

3,428,756
DIAL PULSE TRANSIENT DETECTOR

Barry M. Epstein, Parsippany, N.J., assignor to Bell Telephone Laboratories, Incorporated, New York, N.Y., a corporation of New York

Filed Dec. 23, 1965, Ser. No. 515,830
U.S. Cl. 179—84 6 Claims
Int. Cl. H04m *1/28, 3/02*

ABSTRACT OF THE DISCLOSURE

Circuit for detecting dial pulse transients transmitted over a telephone voice transmission path. Pulse time duration is predetermined.

This invention relates to telephone dial pulse detectors, and more particularly to circuits for detecting dial pulse transients transmitted over a telephone voice transmission path.

In the majority of telephone systems employed at the present time signaling information is transmitted by the operation of a rotary dial by a subscriber. A direct-current dial pulse transmission line exists between the rotary dial and a central office. Changes in the direct-current conditions in the line are caused by the operation of the rotary dial control switching equipment in the central office. It is also often necessary to transmit dial pulse signals over long distances, over telephone voice transmission lines which are designed to carry primarily voice frequency signals from one central office to another. The rotary dial pulses are severely distorted into transient signals as they are transmitted over these voice transmission lines because the dial pulses except for some frequency components lie outside its passband. However, it is important for many purposes that the subscriber be able to control, via the rotary dial, such equipment as remote dictation machines, computer equipment, or automatic reporting equipment. In such a case it is necessary that the direct-current dial pulse signal information be accurately detected after transmission over such a voice transmission path, since a direct-current path often does not exist between the rotary dial and the equipment to be controlled by the dial pulses.

Numerous and various types of equipment connected to the voice transmission path of a telephone network may require direct-current dial pulses for their operation and for this reason it is necessary that satisfactory detectors be available for detecting the dial pulse information that is transmitted over the voice transmission path.

When a dial is operated after a regular telephone connection has been established, transient pulses occur in the voice transmission path rather than the clearly defined break and make steps. The amplitude and frequency characteristics of the transient pulses produced by rotating the dial in these circumstances are of various types. Over short connections the dial pulse responsive signals may be large in magnitude and comprise relatively few oscillations per each dial pulse. Over other types of connections there may be a sequence of random type oscillations for each dial pulse. Over longer connections the transient signals may have an order of magnitude comparable with that of the voltages produced by speech, each dial pulse responsive signal comprising a relatively long duration oscillatory waveform. A generally applicable dial pulse detector must therefore not only respond to many different types of transient waveforms but in addition should also include means to avoid a response to false input signals during normal speech transmission, especially since the magnitude of the speech signals may be as great as that of the signaling information.

It is an object of this invention to detect and analyze dial pulse transients which have been transmitted over the voice transmission path of a telephone network.

It is another object of this invention to detect dial pulse transients and distinguish the transients from speech energy or random noise transmitted over the voice transmission path.

It is yet another object of the invention to detect dial pulse transients independent of the amplitude of the transient signal.

It is still another object to detect dial pulse transients by utilizing detection circuitry which is responsive to the highest common denominator of the dial pulse duration time and spacing.

In accordance with the present invention the dial pulse transients received over a voice transmission path are rectified so that all of the resulting transient spikes containing the dial pulse energy are of the same polarity. This rectified signal is applied to a low-pass filter which integrates the dial pulse energy. The filter is resonant to a submultiple of the periodicity of the make and break times of the dial pulses. The filter is further selected so that its cutoff frequency is well below the passband of the voice transmission path. Since the dial pulse transients occur at submultiples of the periodicity of the make and break occurrences of the dial pulses, an in-phase condition exists between the filter's natural ringing and successive incoming dial pulse transients. Random noise and speech which is transmitted over the voice transmission path is above the aforementioned cutoff frequency and is not in phase with the natural ringing of the filter. Hence, the filter will block out the random noise and speech signals but reinforce the signals due to the periodic dial pulse transients. Each dial pulse produces two transients corresponding respectively to the make and break thereof. Therefore, a counting circuit dividing these two transient signals by two will allow a single pulse to be regenerated for each digit dialed at the originating source. The output of the counter is utilized to produce a direct-current pulse signal which is then used to operate conventional relay equipment.

Further objects, features, and advantages of the invention will become apparent upon consideration of the following detailed description in conjunction with the drawings wherein:

FIG. 1 discloses a schematic diagram of an illustrative embodiment of the present invention;

Figure 1:
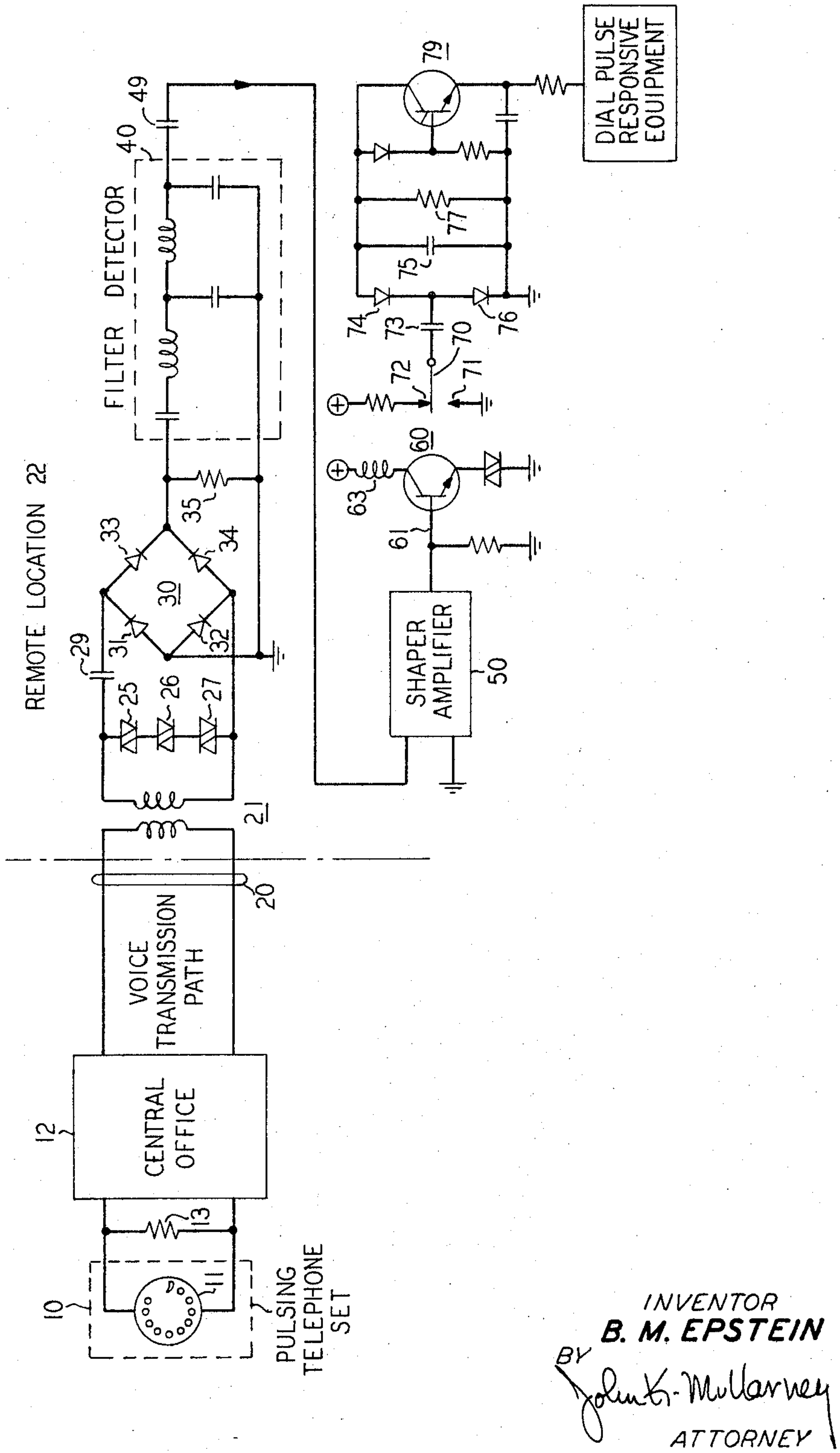
Figure 2A:
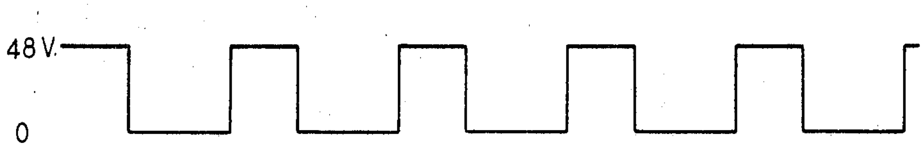
FIGS. 2A, 2B, 2C, 2D and 2E show a typical pulse sequence, the distortions developed as the sequence is transmitted along a typical voice transmission path, and how these distortions are copensated for by the dial pulse detector of the present invention.

Referring particularly to FIG. 1 a typical telephone subset 10 is utilized to generate dial pulses to control some equipment at a remote location. Typical pulses, as generated by the rotary dialer 11 of the telephone subset 10, occur at a repetition rate of about 10 pulses per second as is shown in FIG. 2A. Each pulse comprises a make portion of 40 milliseconds, with a break portion of 60 milliseconds. The pulses created by the rotary dial are transmitted to the central office 12, and from there, via the voice transmission line 20, to the remote location 22, where the equipment to be controlled is located. A resistive load 13 may be inserted to shunt the tip and ring of the telephone set 10 transmitting dial pulses to maintain a minimum line current in order to improve the dial pulse characteristic. There are often many relays located along the voice transmission line 20 which connect the central office 12 to the remote location 22. The resistor 13 prevents a possible vibratory response of these relays to the dial pulses. In addition to the relays, the line may include a plurality of repeater circuits. All of these relays and repeaters tend to distort the dial pulse signals. In addition, the basic frequency spectrum of the dial pulse signals lies outside the passband of the voice transmission line and the amplitude of the dial pulse signals generally exceeds the capacity of this line. As a result of these factors, the dial pulses are severely distorted into transient signals.

Figure 2B:
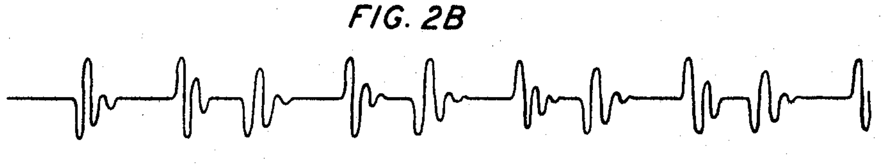

In FIG. 2B typical transient signals are shown. Each make and break transient, as can be seen, is an oscillatory waveform which has both positive and negative peaks. The frequency of this oscillatory waveform is much greater than the ten pulses per second of the original dial pulse. Inasmuch as the voice transmission line 20, as shown in the graph defining its passband 301 in FIG. 3, does not begin to transmit signal energy until its lower cutoff frequency of 200 cycles per second is reached, the dial pulse energy at the pulse repetition rate is not transmitted. The dial pulse energy, as shown by the bandpass characteristic 302, lies almost completely outside the passband of the voice transmission line 20. Only the harmonic components of the basic dial pulse frequency are transmitted by the voice transmission line 20. Hence, signal energy resulting from the applied dial pulses is transmitted over the voice transmission line 20 at a much higher frequency than that of the basic pulse frequency itself. It is this latter dial pulse signal energy which carries the information as to the nature of the original dial pulse signal over the voice transmission path 20 to the remote location.

A signal, which may comprise the dial pulse transients and/or the voice signal which has been transmitted over the voice transmission line 20, arrives at the remote location 22. This signal is applied to the primary coil of a pulse transformer 21. The pulse transformer 21 serves to isolate the incoming signal from ground reference.

Several varistors 25, 26 and 27 are shunted across the secondary of the transformer 21. The varistors are selected to limit the amplitude of the incoming signal to some predetermined level. Selection of varistors to accomplish this purpose will be readily apparent to those skilled in the art and need not be discussed in detail. The amplitude of the incoming signal is limited to permit a single design pulse detector to be constructed regardless of the length of the voice transmission path over which the signals are transmitted. Hence, the dial pulse detector can be activated by either a large signal over a short distance or a small signal over a long distance without critical threshold tuning or danger of overload damage on the detector circuits.

Figure 2C:

The signal transmitted by the pulse transformer 21 is applied, via a coupling capacitor 29, to a full wave rectifier 30 which comprises the diodes 31, 32, 33 and 34. The incoming signal is thus rectified to convert the dual polarity energy representing the dial pulses into energy of one polarity to permit the low-pass filter 40 to integrate the transient pulse energy to some value other than zero and thereby permit its detection. The resistor 35 shunting the full wave rectifier 30 is provided as a return path for its diodes. The pulse energy, which now comprises a rectified transient spike signal, as shown in FIG. 2C, is transmitted to the filter circuit 40.

Figure 3:
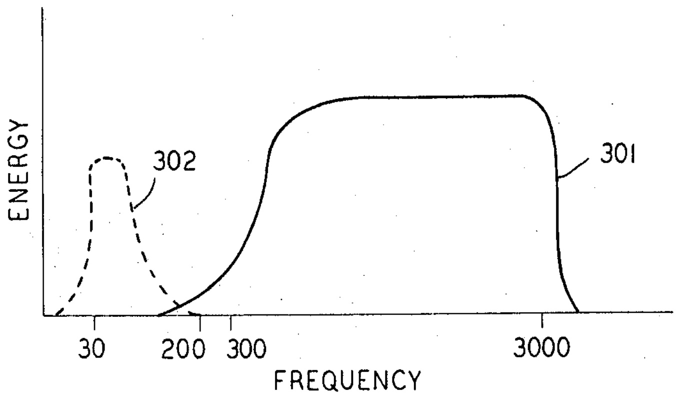
FIG. 3 illustrates the frequency spectrum over which the voice transmission path transmits signal energy.

The filter circuit 40 comprises, as is schematically shown, a series capacitive reactance followed by two sections of an inductive reactance each shunted by a capacitive reactance. The series capacitive reactance is added to obtain the resonance characteristic referred to hereafter. Equivalent embodiments will be readily apparent to those skilled in the art. The characteristics of this filter are designed such that the upper cutoff frequency of the filter is well below the passband of the voice transmission line. As is shown in FIG. 3, the lower frequency boundary of the passband 301 of the voice transmission line 20 is approximately 200 cycles per second. The upper cutoff frequency of the filter is therefore designed to have a sharp attenuation characteristic to cause the greatest possible signal loss to signals between a selected resonant frequency and the 200 cycle lower boundary of the passband of the voice frequency channel. This achieves a high dial pulse signal voltage to voice signal voltage ratio. For example, in the present illustrative embodiment this cutoff frequency is 50 cycles per second with response of the filter above 200 cycles down at least 40 decibels.

The filter is designed to have a natural ringing response at 50 cycles per second. As shown in FIG. 2A, the make and break portions of the dial pulse are respectively 40 and 60 milliseconds long. The 50 cycle ringing response of the filter corresponds to a 20 millisecond interval which is a submultiple of both the 40 and 60 millisecond interval. In summary, the natural resonant response of the filter is selected to be identical to the highest common denominator of the two time intervals representing the make and break periods of the dial pulses.

Selecting the filter's natural ringing response at 50 cycles per second, insures that the incoming signals occurring at the intervals of 20 milliseconds or multiples of the same will be in phase with the filter's natural resonant response and hence reinforcement will take place. Since the dial pulse transient spikes as rectified occur at grouped intervals of 40 and 60 milliseconds, an in-phase condition will exist between the filter's natural ringing and each succeeding group of dial pulse transient spikes. However, in the case of random noise or speech signals, the input to the filter is not in phase with this natural ringing response. The filter will block these random noise and speech signals because they are out of phase with the ringing and, secondly, are outside its bandpass frequency characteristic.

The filter 40 is selected with a high Q factor in order to achieve the greatest possible reinforcement of output for each applied dial pulse transient spike. It will be obvious to those skilled in the art that filter circuits containing the necessary characteristics may be designed differently from the disclosed embodiment without departing from the spirit and scope of the invention.

Figure 2D:
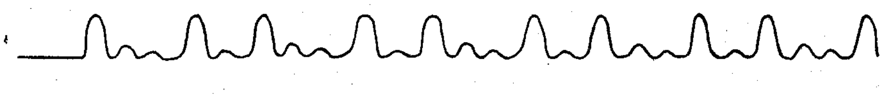

As can be seen from the foregoing explanation, as each dial pulse transient is applied to the filter 40 the transient pulse spike excites the filter into a ringing type action. The pulse energy of each group of transient spikes is integrated by the filter, and shaped into a pulse like signal. The filter 40 continues to ring at its resonant frequency, which is selected so that each succeeding group of transient pulse spikes reinforces that natural ringing action. A typical output response of the filter 40 in response to the rectified dial pulse transient spikes is shown in FIG. 2D. Each rectified make or break group of transient pulse spikes generates a transient responsive pulse of integrated energy. It is noted that small residual pulses exist between the said transient responsive pulses. These small residual pulses are due to the continued ringing action of the filter.

Figure 2E:
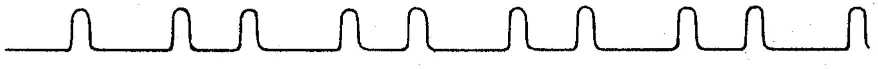

The signal output of the filter circuit 40, as shown in FIG. 2D, is coupled to the shaper amplifier 50 by the coupling capacitor 49. The coupling capacitor 49 blocks direct current and a low frequency signal which are due to random noise or speech. It readily passes the frequency of the detected dial pulse signal. This coupling capacitor 49 prevents a build-up of direct-current voltage within the filter from falsely triggering the following shaper amplifier 50. The shaper amplifier 50 is designed to respond only to signals above a certain threshold value so as to eliminate responses due to the intermediate residual ringing response of the filter circuit 40 described above. The shaper amplifier 50 is designed to have a low frequency cutoff which is approximately 40 cycles per second in the present illustrative embodiment. This is to prevent response of the amplifier to false triggering signals if the entire output level of the filter 40 rises due to accumulated noise or voice signals. A typical pulse output as generated by the shaper amplifier is shown in FIG. 2E.

The pulse output of the shaper amplifier 50 is applied to the base 61 of the switching transistor 60. This transistor 60 is normally biased into a nonconducting condition. The pulse output biases the base-emitter path of the transistor 60 into a conducting condition. With the collector-emitter path of the transistor 60 therefore in a conducting condition, the relay coil 63 is energized.

The energized relay coil 63 activates the relay armature 70 to move from its normal grounded contact 71 to its energized contact 72. It will be readily apparent to those skilled in the art that the capacitors 73 and 75 in combination with the two switching diodes 74 and 76 comprise a diode counter. The size of the capacitor 75 is selected so that two successive pulses within a specified time period are sufficient to build up a voltage which will permit the silicon controlled rectifier 79 to be fired. The timing of the charge build-up on the capacitor 75 is controlled by the bleeder resistance 77 which provides a discharge path to the capacitor 75. This bleeder resistance 77 is selected so that the capacitor 75 must be charged twice by two pulses occurring within approximately 60 milliseconds or the silicon controlled rectifier 79 will not receive a sufficient voltage to be fired. An exact time constant is not necessary, however, the time constant should be sufficiently defined to permit the silicon controlled rectifier 79 to fire when pulses are received at the dial pulse rate but not from pulses which are widely spaced apart or caused by random signal noise. Each time that the silicon controlled rectifier 79 is energized it applies a voltage pulse to the dial pulse responsive equipment 80.

A dial pulse detector in accordance with the invention will be responsive to local and long distance dial pulse transient signals transmitted over a signal path in which both pulsing and voice signals are transmitted without the necessity of complicated timing circuitry or delicate threshold tuning.

Figure 4:
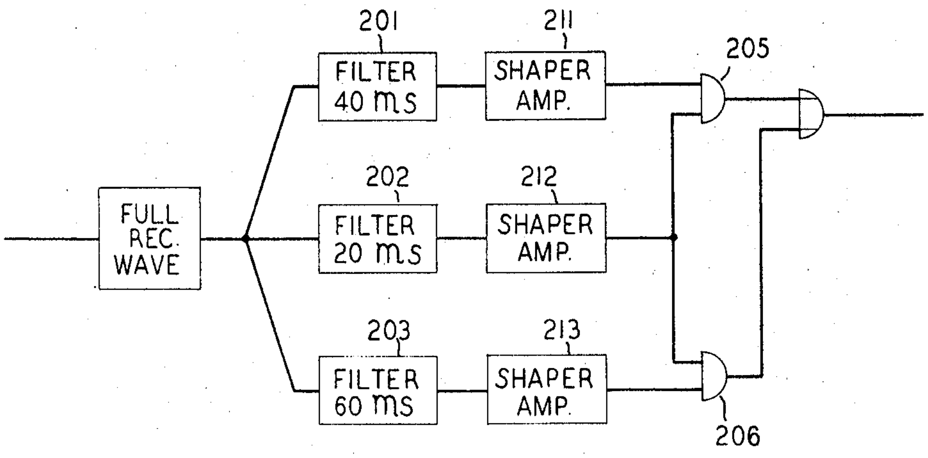
FIG. 4 discloses a schematic diagram of another embodiment of the present invention.

Referring now to FIG. 4, another illustrative embodiment of the present invention is disclosed which is applicable in situations requiring highly selective filtering in the detection of faint dial pulse transients. In this embodiment the rectified dial pulse transient spikes are operatively applied to three separate filter channels. Each filter channel includes a shaper amplifier so that uniform pulse signals are applied to the coincidence gating circuits 205 and 206. Two paired channels are resonately responsive to the make period of the dial pulses (i.e., 40 milliseconds) and two other paired channels are resonately responsive to the break period of the dial pulses (i.e, 60 milliseconds). As is apparent from the FIG. 4, the rectified dial pulse transient spikes are applied to three parallel low-pass filters 201, 202, and 203, respectively. The natural ringing response of the filters is selected, respectively, to be resonant to the make period of the dial pulses, the break period of the dial pulses, and the submultiple period of these two which is their highest common denominator. For instance, filter 202 is tuned to ring at this highest common denominator, or 50 cycles per second. The filter 201 is tuned to ring at 25 cycles per second, which corresponds to the 40 millisecond time interval, and the filter 203 is tuned to ring at 16⅔ cycles per second, which corresponds to the 60 millisecond time interval. The filters 201 and 203 are somewhat more highly damped than filter 202 to prevent interference between the prior and subsequent ringing actions of each individual filter.

Filter 201 is paired with filter 202 and their outputs applied, via the shaper amplifiers 211 and 212, respectively, to the coincidence gate 205. The filter 203 is paired with 202 and their outputs applied, via the shaper amplifiers 212 and 213, respectively, to the coincidence gate 206. The coincidence gates 205 and 206 may comprise conventional voltage responsive threshold adders. It will be immediately obvious to those skilled in the art that two spaced groups of transient spikes responsive to the make duration will ring with the two filters 201 and 202 and hence will cause both filters 201 and 202 to commence ringing. The second group of transient spikes will occur in phase with the first ring of filter 201 and the second ring of filter 202. Hence, a simultaneous reinforced pulse output will be applied by both filters 201 and 202 via their respective shaper amplifiers 211 and 212, to enable the coincidence gate 205. The second group of transient spikes, however, will be applied to the filter 203 before its first cycle of ringing action has been completed. Hence, filter 203 will not resonate and no output will be enabled by the coincidence gate 206. A similar analysis to describe the response of filter 202 and 203 to the make pulse period will be obvious to those skilled in the art.

It is readily apparent that the coincident ringing action of two filters is required to enable either of the coincidence gates 205 or 206. Because of this required coincidence the response of the detector is more selective and there is less danger of the dial pulse detector being activated by intermediate residual ringing responses of any filter due to random noise signals where no dial pulse transient spike is present.

Although the invention has been described with a certain degree of particularity, it is to be understood that the above-described arrangement is illustrative of the application of the principles of the invention. Numerous other arrangements may be devised by those skilled in the art without departing from the spirit and scope of this invention.

What is claimed is:

1. In a telephone system, a source of dial pulses of a predetermined repetition rate, a voice transmission path having a predetermined passband with its lower cutoff frequency above said repetition rate, means to apply said dial pulses to one end of said voice transmission path, and dial pulse detection means at the other end of said voice transmission path including in cascade connection an asymmetrical conduction means to convert the dial pulse signal transients conducted by said voice transmission path to a signal having a unidirectional component and network means to selectively transmit certain desired frequency signals and substantially attenuate all others, said network means serving to attenuate signals within said voice transmission path passband and to resonate in response to particular ones of said transient signals created by said dial pulses, means to count transient pair responses of said pulse detection means and means to activate control circuitry in response to said counting means.

2. In a telephone system, the combination as defined in claim 1 wherein said network means comprises at least one low-pass filter having an upper cutoff frequency below the passband of said voice transmission path and being resonant with a time period equal to the highest common denominator of the make and break time periods of said dial pulses.

3. In a telephone system the combination as defined in claim 1 wherein said selective network comprises a first, a second and a third low-pass filter each of said first, second and third low-pass filters having a cutoff point below the passband of said voice transmission path, said first filter being resonant at a frequency corresponding to the make time period of said dial pulses, said second filter being resonant to a frequency corresponding to a time period equal to the highest common denominator of the make and break time periods of the dial pulses, said third filter being resonant to a frequency corresponding to the break time period of the dial pulses, the signal output of said first and second filters being gated by a first coincidence gate, and the signal output of said second and third filter being gated by a second coincidence gate.

4. A telephone network comprising a transmission channel having a voice frequency passband, means to apply direct-current dial pulses to one end of said voice channel, said dial pulses having a given periodicity for the make and break of each pulse which is outside said voice frequency passband, dial pulse detector apparatus at the other end of said transmission channel for analyzing the dial pulse transients transmitted by said channel, said detector apparatus including means to rectify said dial pulse transients to signals of one polarity, a low-pass filter, means to apply said one polarity signals to the low-pass filter, said filter having an upper cutoff frequency below the passband of said voice channel and being resonant to a submultiple of said given periodicity, a counting circuit for counting transient pairs detected by said filter, and means responsive to the output of said counting circuitry to perform a specified task in response to the direct-current dial pulses.

5. A telephone network including a voice transmission channel having a specified audio frequency passband, means to apply direct-current dial pulses to one end of said voice channel, said dial pulses having a specified periodicity for the make and break duration of each pulse which is below the audio frequency passband, and dial pulse detector apparatus at the other end of said voice channel for analyzing dial pulse transients transmitted by said voice channel, said detector apparatus including means to isolate dial pulse transients and voice signals from ground reference, means to rectify said pulse transients and voice signals to signals of one polarity, a low-pass filter, said filter having an upper cutoff frequency below the audio passband of said voice channel and serving to resonate in response to transient impulses spaced at a multiple of a specified interval, said specified interval corresponding to the highest common denominator of the duration of the make and break periods of said dial pulses, amplifying means to shape the dial pulse transient signals detected by said filter, said amplifying means being responsive only to a predetermined threshold level of signal and having a lower cutoff frequency below the resonant frequency of said filter, counting means connected to the output of said amplifying means to respond to pulse pairs spaced apart less than a predetermined interval, and means responsive to said counting means to control remote equipment.

6. A dial pulse detector as defined in claim 5 further including a coupling capacitor intermediate said filter and said amplifying means to isolate any direct-current signal level stored in said filter and render said predetermined threshold independent of said direct-current signal level stored in said filter.

No references cited.

KATHLEEN H. CLAFFY, *Primary Examiner.*

W. A. HELVESTINE, *Assistant Examiner.*

U.S. Cl. X.R.

179—16